United States Patent
Bachina et al.

(10) Patent No.: US 12,462,082 B2
(45) Date of Patent: Nov. 4, 2025

(54) SATISFYING CIRCUIT DESIGN CONSTRAINTS USING A COMBINATION OF MACHINE LEARNING MODELS

(71) Applicant: Xilinx, Inc., San Jose, CA (US)

(72) Inventors: Satish Bachina, Hyderabad (IN); Karthic P, Chennai (IN); Vishal Tripathi, Kanpur (IN); Srinivasan Dasasathyan, Secunderabad (IN)

(73) Assignee: XILINX, INC., San Jose, CA (US)

( * ) Notice: Subject to any disclaimer, the term of this patent is extended or adjusted under 35 U.S.C. 154(b) by 587 days.

(21) Appl. No.: 17/959,038

(22) Filed: Oct. 3, 2022

(65) Prior Publication Data
US 2024/0111932 A1 Apr. 4, 2024

(51) Int. Cl.
| | |
|---|---|
| G06F 30/32 | (2020.01) |
| G06F 30/327 | (2020.01) |
| G06F 30/3308 | (2020.01) |
| G06F 30/3323 | (2020.01) |
| G06F 30/337 | (2020.01) |
| G06F 30/367 | (2020.01) |
| G06F 30/392 | (2020.01) |
| G06F 30/398 | (2020.01) |

(Continued)

(52) U.S. Cl.
CPC .............. *G06F 30/32* (2020.01); *G06F 30/27* (2020.01); *G06F 30/327* (2020.01);
(Continued)

(58) Field of Classification Search
CPC .... G06F 30/32; G06F 30/327; G06F 30/3308; G06F 30/3323; G06F 30/337; G06F 30/367; G06F 30/392; G06F 30/398; G06F 30/27; G06N 5/01; G06N 5/02; G06N 5/04; G06N 3/042; G06N 3/08; G06N 7/01; G06N 7/023; G06N 20/00
(Continued)

(56) References Cited

U.S. PATENT DOCUMENTS 7,356,526 B2 * 4/2008 Gao ................... G06F 16/24547
707/999.005
8,141,068 B1 * 3/2012 Thompson .............. G06F 8/445
717/161

(Continued)

OTHER PUBLICATIONS

Cai et al., Chinese Patent Document No. CN-113240130-A, published Aug. 10, 2021, 4 pages including abstract and claims and 1 drawing. (Year: 2021).*

(Continued)

*Primary Examiner* — Phallaka Kik
(74) *Attorney, Agent, or Firm* — Patterson + Sheridan, LLP (57) ABSTRACT

Multiple classifier models are applied to features of a circuit design after processing the design through a first phase of an implementation flow. Each classifier model is associated with one of multiple directives, the directives are associated with a second phase of the implementation flow, and each classifier model returns a value indicative of likelihood of improving a quality metric. Regressor models of each set of a plurality of sets of regressor models are applied to the features. Each directive is associated with one of the sets of regressor models, and a combined score from each set of regressor models indicates a likelihood of satisfying a constraint. The directives are ranked based on the values indicated by the classifier models and scores from the sets of regressor models, and the circuit design is processed n the second phase of the implementation flow by the design tool using the directive having the highest rank.

20 Claims, 6 Drawing Sheets

(51) Int. Cl.
*G06N 3/042* (2023.01)
*G06N 3/08* (2023.01)
*G06N 5/01* (2023.01)
*G06N 5/02* (2023.01)
*G06N 5/04* (2023.01)
*G06N 7/01* (2023.01)
*G06N 7/02* (2006.01)
*G06N 20/00* (2019.01)
*G06F 30/27* (2020.01)
*G06F 119/06* (2020.01)

(52) U.S. Cl.
CPC ...... *G06F 30/3308* (2020.01); *G06F 30/3323* (2020.01); *G06F 30/337* (2020.01); *G06F 30/367* (2020.01); *G06F 30/392* (2020.01); *G06F 30/398* (2020.01); *G06F 2119/06* (2020.01); *G06N 3/042* (2023.01); *G06N 3/08* (2013.01); *G06N 5/01* (2023.01); *G06N 5/02* (2013.01); *G06N 5/04* (2013.01); *G06N 7/01* (2023.01); *G06N 7/023* (2013.01); *G06N 20/00* (2019.01)

(58) Field of Classification Search
USPC ................ 716/122, 123, 124, 104, 106, 111; 703/14; 706/12, 25, 20, 21, 45; 700/45, 700/48, 49, 50, 51
See application file for complete search history.

(56) References Cited

U.S. PATENT DOCUMENTS

| | | | | |
|---|---|---|---|---|
| 8,589,855 B1* | 11/2013 | Ward | ................... | G06F 30/392 716/136 |
| 11,003,826 B1* | 5/2021 | Dasasathyan | ......... | G06F 30/392 |
| 11,188,702 B1* | 11/2021 | Jiang | ..................... | G06F 30/398 |
| 11,790,139 B1* | 10/2023 | Sivaswamy | ............. | G06F 30/31 716/102 |
| 2007/0288242 A1* | 12/2007 | Spengler | ................. | G10L 15/20 704/E15.04 |
| 2013/0325782 A1* | 12/2013 | Fujimaki | .................. | G06N 5/02 706/46 |
| 2014/0249873 A1* | 9/2014 | Stephan | ........... | G06Q 10/06375 705/7.11 |
| 2020/0210764 A1* | 7/2020 | Hamedi | ................ | G06V 10/776 |
| 2021/0174958 A1* | 6/2021 | Drake | .................... | G06N 20/10 |
| 2021/0279377 A1* | 9/2021 | Kuniavsky | ............ | G06F 40/117 |
| 2023/0034736 A1* | 2/2023 | Singh | .................. | G06F 30/3315 |
| 2023/0259575 A1* | 8/2023 | Hamedi | ................ | H04L 67/146 709/219 |
| 2024/0289586 A1* | 8/2024 | Balakrishnan | ......... | G06N 3/098 |
| 2024/0370492 A1* | 11/2024 | Avnor | ................. | G06F 16/7837 |

OTHER PUBLICATIONS

Srinivasan Dasasathyan, et al., "DeCA: Vivado Strategies suggested by Machine Learning", Xilinx, Downloaded Aug. 4, 2022.

Trevor Hastie, et al., "The Elements of Statistical Learning Data Mining, Inference, and Prediction", Springer Series in Statistics, 2nd Edition, Corrected 12th printing Jan. 13, 2017; pp. 587-601.

Que Yanghua, et al., "Improving Classification Accuracy of a Machine Learning approach for FPGA Timing Closure", 2016 IEEE 24th Annual International Symposium on Field-Programmable Custom Computing Machines, Downloaded on May 2, 2022, from IEEE Xplor.

Nachiket Kapre, et al., "InTime: A Machine Learning Approach for Efficient Selection of FPGA CAD Tool Parameters", FPGA'15, Feb. 22-24, 2015, Monterey, California, USA. Copyright ACM 978-1-4503-3315-3/15/02.

* cited by examiner

SATISFYING CIRCUIT DESIGN CONSTRAINTS USING A COMBINATION OF MACHINE LEARNING MODELS

TECHNICAL FIELD

The disclosure generally relates to training and using a combination of machine learning models to satisfy design constraints in implementing circuit designs.

BACKGROUND

Timing closure is one example of an important objective for Electronic Design Automation (EDA) tools in processing circuit designs targeted to application specific integrated circuit (ASICs), system on chips (SoCs), or field programmable gate arrays (FPGAs). Other examples of objectives include satisfying constraints relating to circuit area and power consumption.

In EDA tools, the behavior of the algorithms used for implementing and optimizing designs is highly non-linear and usually difficult to predict. The algorithms also involve objective functions and are usually heuristic in nature. A typical EDA tool consists of many such algorithms working in sequence, which is sometimes referred to as an "implementation flow" or "design flow." Each step/algorithm in the sequence typically employs a heuristic to solve a specific problem. In some cases, a specific objective or cost function is used.

The algorithms involved in an implementation design flow are often tuned using suites of benchmark designs. The tuning usually involves selecting a specific variation of heuristic and/or setting default values for various parameters that are used to guide the exploration of the solution space. Tuning for EDA tools that operate on circuit designs targeted to FPGAs can be even more complex due to the wide range and variety of designs on which the tools must effectively solve design closure objectives. A specific variation of heuristic or set of parameter settings that yields suitable results for all types of circuit designs is unattainable. As a result, EDA tools are usually enhanced from one release to the next to improve the mean or median performance relative to a benchmark suite of circuit designs. Though a new release does not guarantee that all designs will show improvement.

The complexity involved in achieving timing closure and other objectives often forces designers to change the design and perform multiple iterations through the EDA implementation flow to achieve closure on a design. In some instances, designers may resort to trials using seemingly random parameter settings.

SUMMARY

A disclosed method includes identifying features of a circuit design produced by a design tool from processing the circuit design through a first phase of a plurality of phases of an implementation flow. The method includes applying a plurality of classifier models to the features by the design tool. Each classifier model is associated with a directive of a plurality of directives, the plurality of directives are associated with a second phase of the implementation flow, each directive specifies a set of parameter settings for the second phase, and each classifier model returns a value indicative of whether or not application of the associated directive is likely to improve a quality metric. The method includes applying regressor models of each set of a plurality of sets of regressor models to the features by the design tool. Each directive is associated with a set of the plurality of sets of regressor models, and a respective combined score from each set of regressor models indicates a likelihood of satisfying a design constraint by the associated directive. The method includes ranking the directives based on the values indicated by the classifier models and scores from the sets of regressor models, and processing the circuit design in the second phase of the implementation flow by the design tool using the directive having the highest rank.

Another disclosed method includes performing an implementation flow through one phase by a design tool on each circuit design of a training set using each directive of a plurality of directives. The one phase is a phase of a plurality of phases of the implementation flow, and each directive includes a set of parameter settings for the one phase. The method includes determining respective levels of improvement by the design tool, relative to a baseline value, of a quality metric based on values of the quality metric from performing the implementation flow on each circuit design using each directive. The method includes determining a respective feature set of each circuit design by the design tool after performing each implementation flow on the circuit design using each directive. The method includes training a plurality of classifier models based on the respective feature sets and the respective levels of improvement. Each classifier model is associated with one directive of the plurality of directives, and each classifier model returns a value indicative of whether or not application of the associated directive is likely to improve the quality metric. The method includes training a plurality of sets of regressor models by the design tool based on the respective feature sets and likelihood of satisfying a design constraint. Each set has two or more regressor models and is associated with a directive of the plurality of directives, and each regressor model returns a category score that indicates a likelihood of satisfying a design constraint based on a category metric of the circuit design.

A disclosed system includes one or more computer processors configured to execute program code and a memory arrangement coupled to the one or more computer processors. The memory arrangement is configured with instructions of a design tool that when executed by the one or more computer processors cause the one or more computer processors to perform operations including identifying features of a circuit design produced by the design tool from processing the circuit design through a first phase of a plurality of phases of an implementation flow. The operations include applying a plurality of classifier models to the features by the design tool. Each classifier model is associated with a directive of a plurality of directives, the plurality of directives are associated with a second phase of the implementation flow, each directive specifies a set of parameter settings for the second phase, and each classifier model returns a value indicative of whether or not application of the associated directive is likely to improve a quality metric. The operations include applying regressor models of each set of a plurality of sets of regressor models to the features by the design tool. Each directive is associated with a set of the plurality of sets of regressor models, and a respective combined score from each set of regressor models indicates a likelihood of satisfying a design constraint by the associated directive. The operations include ranking the directives based on the values indicated by the classifier models and scores from the sets of regressor models, and processing the circuit design in the second phase of the implementation flow by the design tool using the directive having the highest rank.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed methods and systems employ a dual modeling approach to predict a directive(s) that is likely to provide a desired quality of result when applied to an implementation flow on a circuit design. A directive is a set of parameter settings that can be provided as input to and influence processing by a phase or sub-phase of the implementation flow performed by one or more design tools. The dual modeling approach uses classifier models in combination with sets of regressor models. Each directive has an associated classifier model and an associated set of regressor models.

Each classifier model is trained to provide an indication of whether or not application of the associated directive is likely to improve a quality of result ("QoR" or "quality metric"), such as a maximum clock frequency. Each set of regressor models includes multiple regressor models, and each regressor model of the set indicates a likelihood of satisfying a design constraint by the associated directive based on a category metric of the circuit design. The methods and systems rank the directives based on the values indicated by the classifier models and scores from the sets of regressor models. Once ranked, the circuit design can be processed in one or more implementation flows (iterations) using the directive(s) having the highest rank. Using the dual modeling approach to predict a directive(s) can significantly reduce the amount of computer system resources (processor and memory) required to find an implementation that satisfies particular design constraints by reducing the number of iterations of the implementation flow. In addition, the disclosed approaches do not require performing all phases of an implementation flow to select the directive most likely to provide desired results. Rather, the disclosed training and inference processes use features of the circuit design present after completing an earlier phase to select the directive to use in a subsequent phase.

Figure 1:
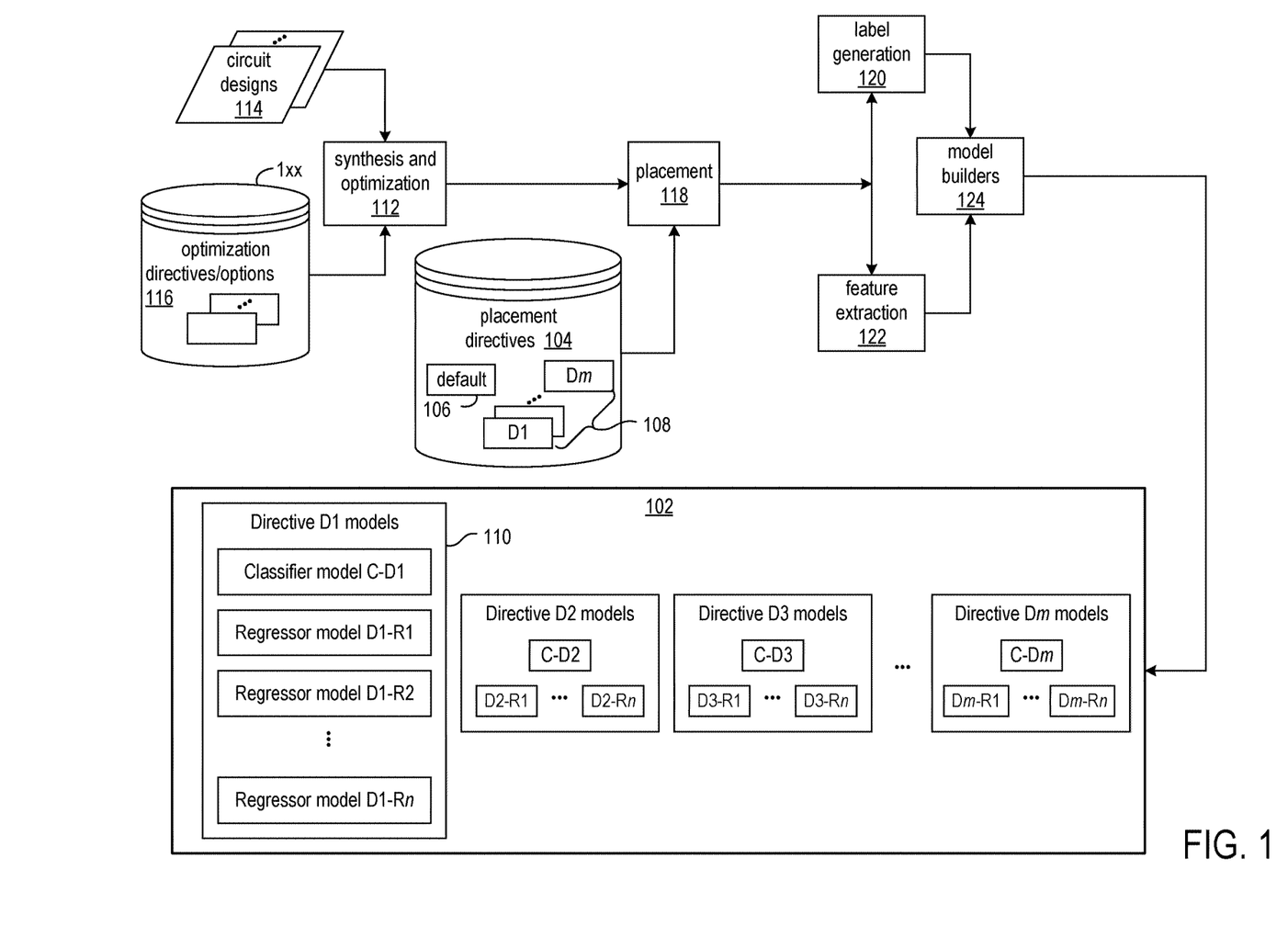
FIG. 1 shows an exemplary system for training classifier models and sets of regressor models.

FIG. 1 shows an exemplary system for training classifier models and sets of regressor models. The classifier models and sets of regressor models are used to aid in selecting a directive to use in an implementation flow, or selecting multiple directives for alternative implementation flows.

In the exemplary system, the directives are applicable to the placement phase in an implementation flow. It will be appreciated, however, that the disclosed training and inference methods can be adapted to other phases and/or sub-phases of implementation flow. For example, physical optimization and routing phases would have directives different from the placement directives, and those phases can have dedicated classifier models and sets of regression models. Dedicated models could also be employed for intermediate checkpoint (sub-phase) flows to select directives, such as for global placement or detailed placement.

The placement directives 104 include a default directive 106 and m directives 108, which are labeled as D1, ..., Dm, directed to aid in closing timing. For the placement phase performed by an exemplary design tool, the placement directives that can be predicted can include: "explore," "early block placement," "extra net delay-low," "extra net delay-high," "alt-spread logic-low," "alt-spread logic-high," "SSI spread logic-high," "SSI balance SLRs," "SSI balance SLLs," "SSI high utilization SLRs," and "extra timing optimization." The exemplary placement directives are those available for use with the Vivado Design Suite tools from AMD, Inc.

The "explore" directive has parameters that direct the placement process to expend greater effort in detailed placement and post-placement optimization. The "early block placement" directive directs the placement process to finalize placement of certain blocks, such as RAM blocks and digital signal processing (DSP) blocks, early in the placement process and to use those blocks as anchors to place the remaining logic. The "extra net delay-low" directive directs the placement process to employ a low level of pessimism when estimating delays, and the "extra net delay-high" directive directs the placement process to employ a high level of pessimism when estimating delays. The "alt-spread logic-low" directive directs the placement process to use a minimal level of spreading logic throughout the device while attempting to avoid creating congested regions, and the "alt-spread logic-high" directive directs the placement process to use a maximum level of spreading logic throughout the device while attempting to avoid creating congested regions. The "SSI spread logic-high" directive instructs the placement process to use a maximum level of spreading logic throughout a stacked silicon interconnect ("SSI") device to avoid creating congested regions. The "SSI balance SLRs" directive instructs the placement process to partition the logic across super logic regions (SLRs) and allocate extra area for regions of higher connectivity. The "SSI balance SLLs" directive instructs the placement process to partition the logic across SLRs while attempting to balance super long lines (SLLs) between SLRs. The "SSI high utilization SLRs" directive instructs the placement process to attempt to place logic closer together in each SLR. The "extra timing optimization" directive instructs the placement process to use additional algorithms for timing-driven placement during later stages of placement.

The models in the training system are shown in block 102, which can be a computer data storage arrangement (RAM, SSD, networked storage devices, etc.). Each of the m placer directives has one associated classifier model and an associated set of n regressor models. For example, the models associated with directive D1 are shown in block 110, the classifier model associated with directive D1 is labeled C-D1, and the regression models are labeled D1-R1, D1-Rn.

Generally, each classifier model indicates whether or not a particular directive applied to a design having a particular set of features is likely to improve the quality metric. Each regressor model provides a score (range of 3 or more values) indicating a likelihood a particular directive applied to a design having a particular category metric would produce a result that satisfies a design constraint.

Each classifier model is trained to return a value (a label) indicative of whether or not application of the associated directive is likely to improve a quality metric, such as timing, power consumption, or area. An exemplary quality metric involving timing closure could be the maximum frequency that is attainable in the slowest clock domain in the design.

In the exemplary system, the label provided to train the classifier model is a binary label having a value of 1 or 0. In response to the level of improvement in QoR being greater than or equal to a threshold value, for example, 1%, the value 1 is returned. Otherwise, a value of 0 is returned. The percentage level of improvement can be customized according to the desired metric, targeted device, and implementation requirements.

The disclosed approaches employ a random forest model to implement the classifier models. Alternative binary classifier models that could be used in the disclosed methods and systems and include decision trees, boosted trees, warm-start classifier methods, support vector machines, convolutional neural networks, or graph neural networks.

Each directive has an associated set of regressor models. Each regressor model is trained to provide a label that indicates a likelihood of satisfying a design constraint based on a category metric of the circuit design. The category metrics on which the regressor models are trained in the exemplary system include an overall category metric, a design constraint category metric, a netlist category metric, a clocking category metric, a congestion category metric, and a QoR category metric.

The labels on which the regressor models are trained can be scores that quantify the category metrics. The value of each score of the associated category metric indicates the likelihood that a design constraint, such as timing, will be satisfied in the placed design. According to one implementation, each score can range from 1-5, with greater values indicating a greater likelihood that the design constraint will be satisfied. The value 1 indicates that the design constraint cannot be satisfied in the design constraint, and the value 5 indicates that the design constraint design can easily be satisfied in the placement process.

The score of the overall category metric is an aggregation of the scores of two or more of the other category metrics. For example, the score of the overall category metric can be a sum of the two or more other scores.

The score of the design constraint category metric indicates for a critical path, how close that is path to satisfying a timing constraint on a scale of 1 to 5. For example, the score of the design constraint category metric can be a scaled value of the absolute value of the negative slack of the path.

The score of the netlist category metric indicates the likelihood of the design constraint being satisfied based on the levels of utilization of various primitives (e.g., DSPs, LUTRAMS, carry chains, block RAMs). A low score indicates a high utilization, and a high score indicates a low utilization. The score can be a scaled value (1-5) of the mean or median of the levels of utilization of the different primitives.

The score of the clocking category metric indicates the likelihood of the design constraint being satisfied when the design has particular clock structures, such as an unbalanced clock tree. For example, a low score can indicate that the number such structures in the design exceeds a threshold, and different scores can be based on different thresholds.

The score of the congestion category metric indicates the likelihood of the design constraint being satisfied based on the number of regions of the target device that exhibit congestion. A region can be considered to be congested in response to the utilization level of resources within the region exceeding a threshold. For scores ranging in value from 1-5, the score can be determined based on which of 5 ranges of numbers the actual number of congested regions falls within.

The score of the QoR category metric indicates the likelihood of the design constraint being satisfied based on the quality metric, for example, maximum clock frequency that is attainable in the slowest clock domain in the design.

Each regressor model can be implemented by a random forest, for example.

Training of the classifier models and sets of regressor models begins with the synthesis and optimization process (or "phase") 112 of the implementation flow processing circuit designs 114 of a training set. The synthesis and optimization processes can use various optimization directives 116 in processing the design. The optimization directives can specify tasks such as constant propagation and merging of smaller LUTs into larger LUTs. Each design in the training set can be synthesized and optimized using the different directives. For example, the training set can have x designs, the optimization directives can have y directives, and x*y different synthesized designs can be generated for the placement process (or "phase") 118.

Generally, the placement process determines a suitable assignment of logical netlist cells to physical device resources according to design constraints, such as timing, floorplan, and manual placement requirements. Placement generally begins with global resources including input/output and clocking resources and logic clusters based on design hierarchy. According to the exemplary training system, the placement process is performed on each of the synthesized designs using the default directive 106. The default directive optimizes for both performance and runtime, whereas the list of available directives optimize for performance.

The placement process is also performed on each of the synthesized designs using each of the directives 108 (D1, . . . , Dm).

The QoR values of the placed designs resulting from the default directive 106 are used as baselines for comparison against the QoR values of the placed designs resulting from directives 108. The comparisons are used to determine the values of labels for the classifier models. The label generation process 120 determines labels for the classifier models and the regressor models associated with the directives. The label generation process determines a classifier label based on the level of improvement of the QoR of a placed design resulting from the placement process using one of the directives 108, relative to the baseline QoR values of the corresponding placed design.

The label generation process can invoke known design tool processes to determine the QoR values, and then can determine the difference between the two values. In response to the difference being less than a threshold amount, such as a percentage, the label generation process can assign the value 0 to the label. In response to the difference being greater than or equal to the threshold amount, the label generation process can assign the value 1 to the label.

For each placed design resulting from the placement process using one of the directives 108, the label generation process determines labels for the regressor models of the set associated with that directive. As described above, the labels can be scores that quantify the category metrics. Each score indicates the likelihood that using the directive in placement would result in a placed design that satisfies a design constraint.

The feature extraction process 122 determines respective feature sets of the placed design resulting from directives 108 by searching the placed circuit designs for characteristics relevant to the classifier models and regressor models. In the exemplary system the features applicable to a field programmable gate array (FPGA) can include utilization and availability of different logic blocks (FF, LUT, CLB, URAM, F7 Muxes, carry8, global clocks, pblocks, soft LUTNMs etc.), input/output columns, SLRs, and SLR-wise clock regions.

The features can also include an indicator that a count of high-fanout nets is greater than a threshold (e.g., 10,000). A net can be considered to be a high-fanout net if the net has a count of fanouts greater than another threshold (e.g., 25,000). The features can include another indicator that signals presence in the circuit design of a non-buffered net having a count of fanouts greater than a threshold (e.g., 10,000).

For each placed design resulting from the placement process using one of the directives 108, the classifier label, scores of the category metrics, and associated feature set are input to the model builder processes 124. The Scikit-learn open source libraries can be used to build and train the models.

Figure 2:
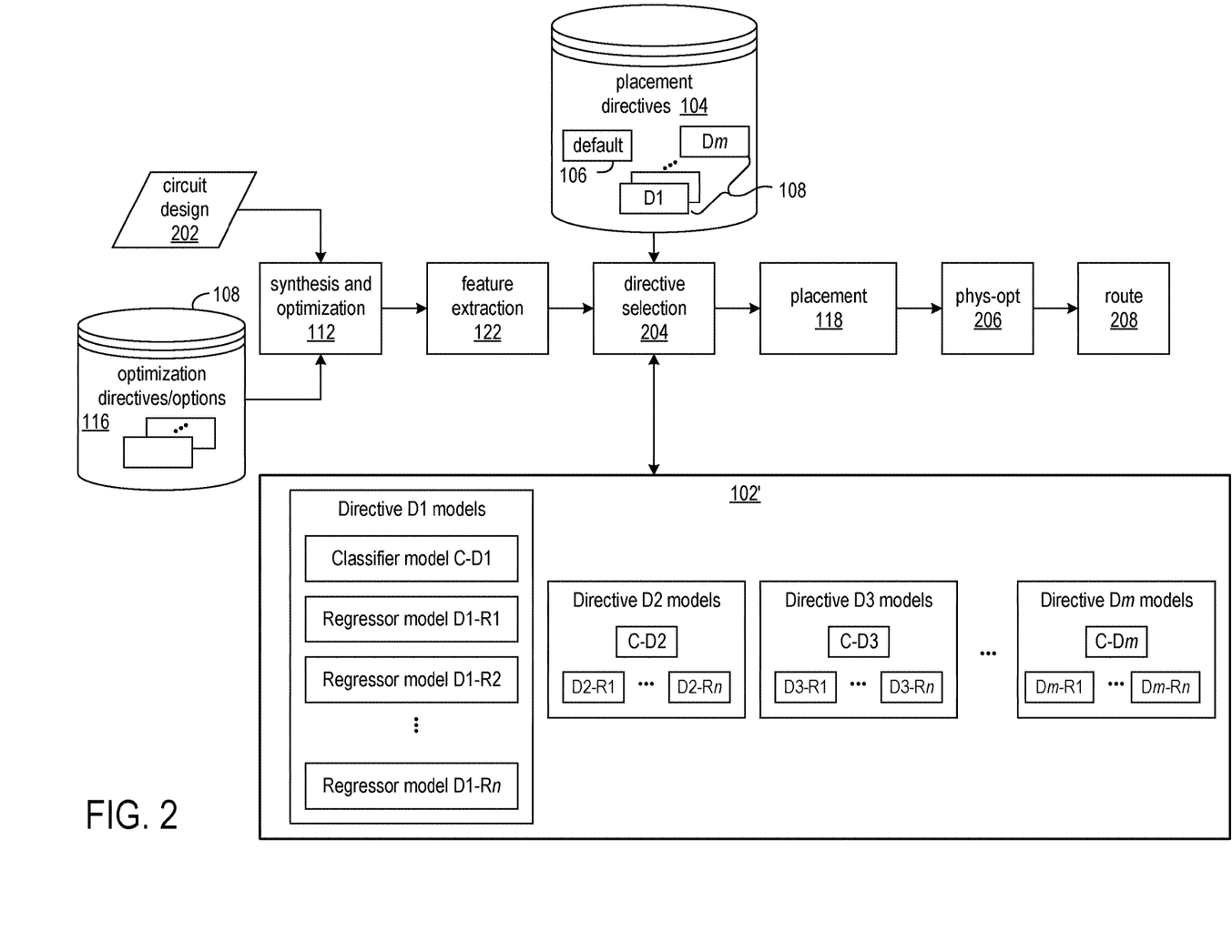
FIG. 2 shows an exemplary system that uses trained classifier models and sets of regressor models to select a directive to apply to a phase of an implementation flow for a circuit design.

FIG. 2 shows an exemplary system that uses trained classifier models and sets of regressor models to select a directive to apply to a phase of an implementation flow for a circuit design 202. The trained models are shown as block 102' and are the models prepared by the training system of FIG. 1. The circuit design 202 can be a design that is targeted for implementation on a particular integrated circuit device. The synthesis and optimization process 112, optimization directives 116, feature extraction process 122, directive selection logic 204, trained models 102', placement directives 108, placement process 118, physical optimization process 206, and routing process 208 are elements of an EDA tool set (or collectively, a "design tool").

As directed by a user, the synthesis and optimization process 112 process inputs the circuit design 202 and synthesizes and optimizes the design as directed by a one or more of the directives 116 and specified by the user.

The feature extraction process 122 identifies the set of features present in the synthesized design produced by the synthesis and optimization phase, and the set of features is provided as input to the directive selection process 204. The directive selection process applies each of the classifier models C-D1, C-Dm to the set of features. The directive selection process also applies the regressor models D1-R1, ..., D1-Rn, ..., Dm-R1, ..., Dm-Rn to the set of features.

The directive selection process 204 ranks the directives based on the labels returned by the classifier models and the sets of scores returned by the sets of regressor models. A lower ranking of a directive indicates that a placed design resulting from the lower ranking directive in placement process is less likely to satisfy the design constraint than would a placed design resulting from a higher ranking directive in placement process.

The directive selection process selects one or more of the highest ranking directives and provides the selected directive(s) to the placement process 118. The placement process processes the synthesized design according to the selected directive(s) and generates a placed design(s) for each selected directive.

In response to the placed design satisfying the design constraint, the physical optimization process 206 can be run to further improve the QoR. The physical optimization process can include replication of high fanout drivers, retiming, and register re-placement as well as other optimizations specific to the target architecture. The routing process 208 generates a routed design from the placed and physically optimized design. The implementation flow can include additional processes to generate data from which an integrated circuit can be made. For targeted devices that are FPGAs, for example, a bitstream generation process (not shown) can input the routed design and generate configuration data for configuring an FPGA device or FPGA resources of a system-on-chip (SoC).

Figure 3:
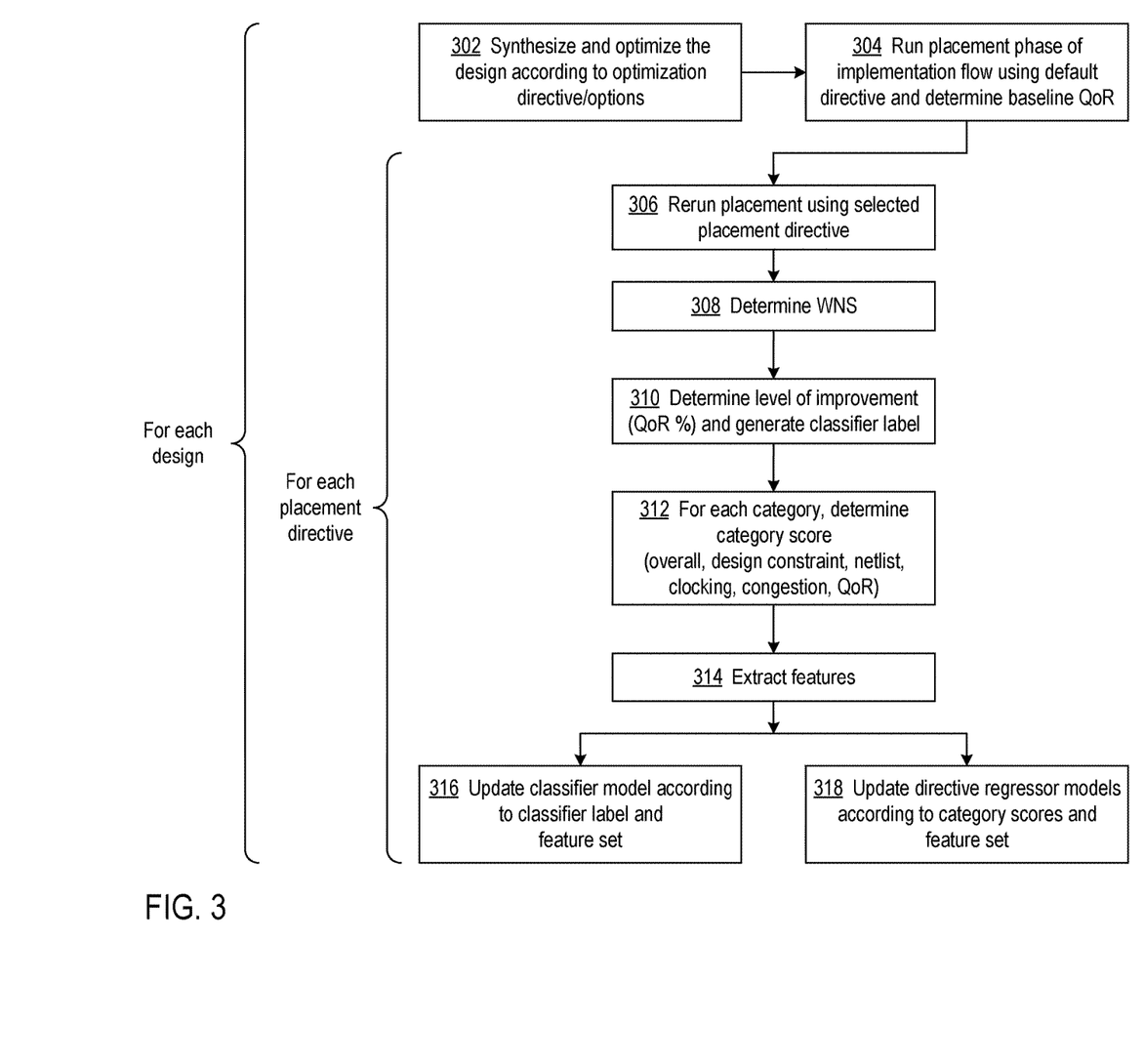
FIG. 3 shows a flowchart of an exemplary process for training the classifier models and sets of regressor models.

FIG. 3 shows a flowchart of an exemplary process for training the classifier models and sets of regressor models. The process of FIG. 3 is performed for each design in the training set. At block 302, the design tool synthesizes and optimizes a design of the training set according to an optimization directive. Note that the process of FIG. 3 can be repeated for each design in the training set using a different optimization directive, such that different synthesized designs can be generated from the same training design using different directives.

At block 304, the placement phase of the implementation flow is initiated by the design tool on the synthesized design using the default directive ("d"), and the design tool determines a baseline QoR from the placed design. According to an exemplary approach, the QoR can be the worst negative slack (WNS) in the placed design ("$WNS_d$").

The processing of blocks 306, 308, 310, 312, 314, 316, and 318 is performed on the placed design for each of the directives associated with the classifier and sets of regressor models. That is, the processing of blocks 306, 308, 310, 312, 314, 316, and 318 is repeated on a synthesized design using each of the different directives.

At block 306, the design tool reruns the placement process using one of the directives (directive i of n directives, denoted, "Di"), and at block 308 the design tool determines the WNS of the placed design ($WNS_{Di}$) resulting from application of the directive.

At block 310, the design tool determines the level of improvement of the QoR and generates a classifier label. In an exemplary approach, the level of improvement can be calculated as $(WNS_{Di} - WNS_d)/WNS_d * 100\%$. In response to the level of improvement being greater than or equal to a threshold, for example, 1%, the design tool assigns the value 1 to the classifier label, and in response to the level of improvement being less than the threshold, the design tool assigns the value 0 to the classifier label. The level of improvement in the WNS can be indicative of the likelihood that a design constraint of a maximum clock frequency would be achieved by applying the directive.

At block 312, the design tool determines a category score for each category metric. Each category score indicates a likelihood of satisfying a design constraint by using the associated placement directive. The category metrics include an overall category metric, a design constraint category metric, a netlist category metric, a clocking category metric, a congestion category metric, and a QoR category metric as described above.

At block 314, the design tool identifies features of the placed design. The set of features and the classifier label are provided to a model builder process at block 316 to update the classifier model associated with the directive Di. At block 318, the design tool provides the set of features and the category scores to the respective regressor models of the set of regressor models associated with the directive Di.

Figure 4:
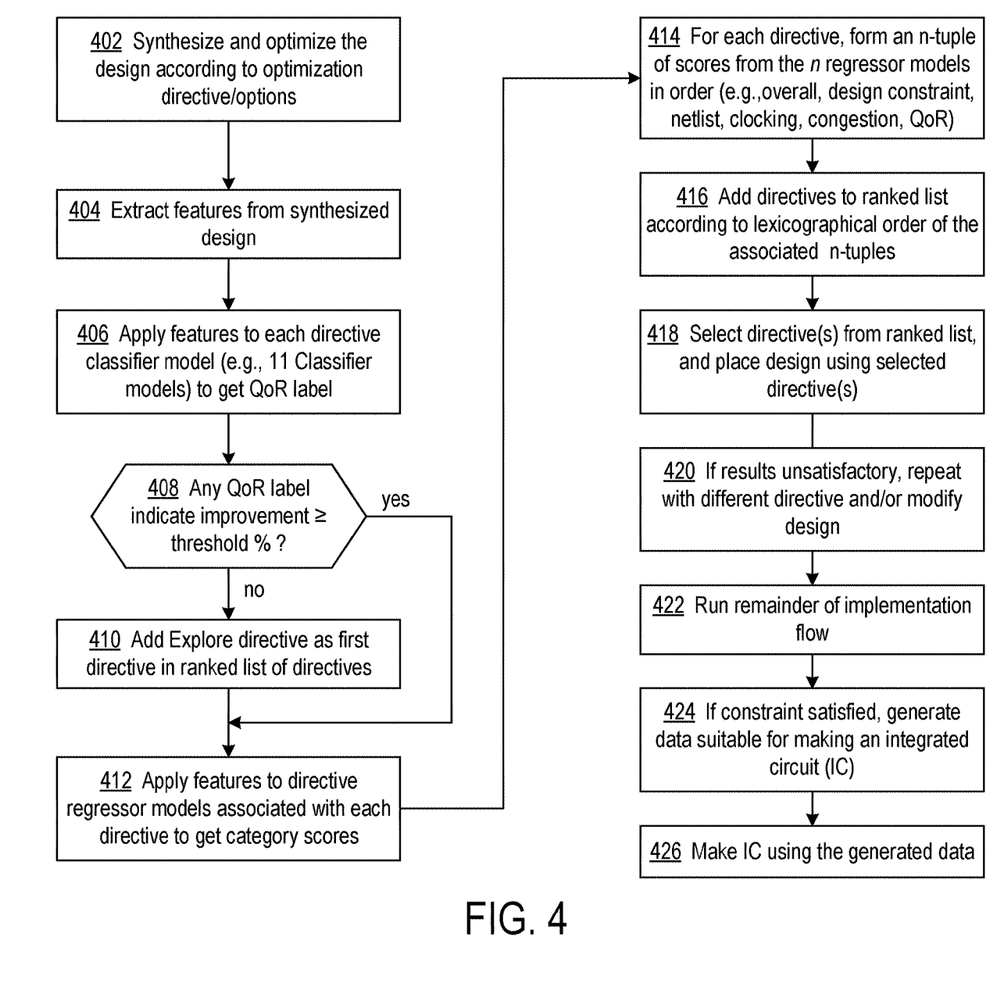
FIG. 4 shows a flowchart of an exemplary process that uses the trained classifier models and sets of regressor models to select a directive to apply to a placement phase of an implementation flow.

FIG. 4 shows a flowchart of an exemplary process that uses classifier models and sets of regressor models to select a directive to apply to a placement phase of an implementation flow. At block 402, the design tool synthesizes and optimizes a circuit design using one or more optimization directives in response to user input.

At block 404, the design tool identifies features of the circuit design relevant to selecting a placement directive, and at block 406 the design tool provides the set of features to the classifier models associated with the placement directives. In response to the set of features, each classifier model returns a binary value that indicates whether or not application of the associated directive is likely to improve the quality metric by a threshold amount.

At decision block 408, the design tool determines whether any of the labels returned from the classifier models indicate that the QoR is likely to be improved by an amount that is greater than or equal to a threshold. If none of the labels indicate that that the QoR is likely to be improved by the threshold amount, at block 410 the "explore" placement directive is added as the highest ranking directive in a list of directives ordered by rank.

At block 412, the design tool provides the set of features to each regressor model in each set of regressor models. In response to the set of features, each regressor model returns a category score based on a category metric. The category score indicates a likelihood that the design constraint will be satisfied in a placement resulting from application of the associated placement directive by the placement process.

For each set of regressor models, the design tool generates a combined score from the category scores of the set at block 414. According to an exemplary approach, an n-tuple is formed from the category scores, and the category scores in the n-tuple are ordered by significance of the category metrics. For example, from most significant to least significant, the order of the category scores is: 1) overall category metric score, 2) design constraint category metric score, 3) netlist category metric score, 4) clocking category metric score, 5) congestion category metric score, and 6) QoR category metric score. The directive that is associated with each n-tuple is the directive that is associated with the set of regressor models that generated the category scores of the n-tuple. At block 416, the design tool ranks the n-tuples in lexicographical order and adds the associated directives to the ranked list of directives in rank order.

At block 418, the design tool selects a highest ranking placement directive(s) from the ranked list and initiates the placement process using the selected directive(s). If more than one highest ranking placement directive is selected, the design tool can execute multiple placement processes in parallel using the selected directives.

In response to the placed design(s) failing to satisfy a design constraint, at block 420 the design process can repeat the placement processing using a different directive(s), or the user may modify the design and repeat the process beginning at block 402.

At block 422, once a satisfactory placement is achieved, the design tool can run the remaining processes of the implementation flow. The remaining processes include physical optimization, which is optional, and routing. At block 424, once all constraints are satisfied, the design tool can further process the routed circuit design to generate data that is suitable for making an integrated circuit. Circuit configuration or fabrication tools (not shown) can be used to make a circuit by configuring a device having programmable logic or fabricating an application specific integrated circuit (ASIC) based on the generated data at block 426.

Figure 5:
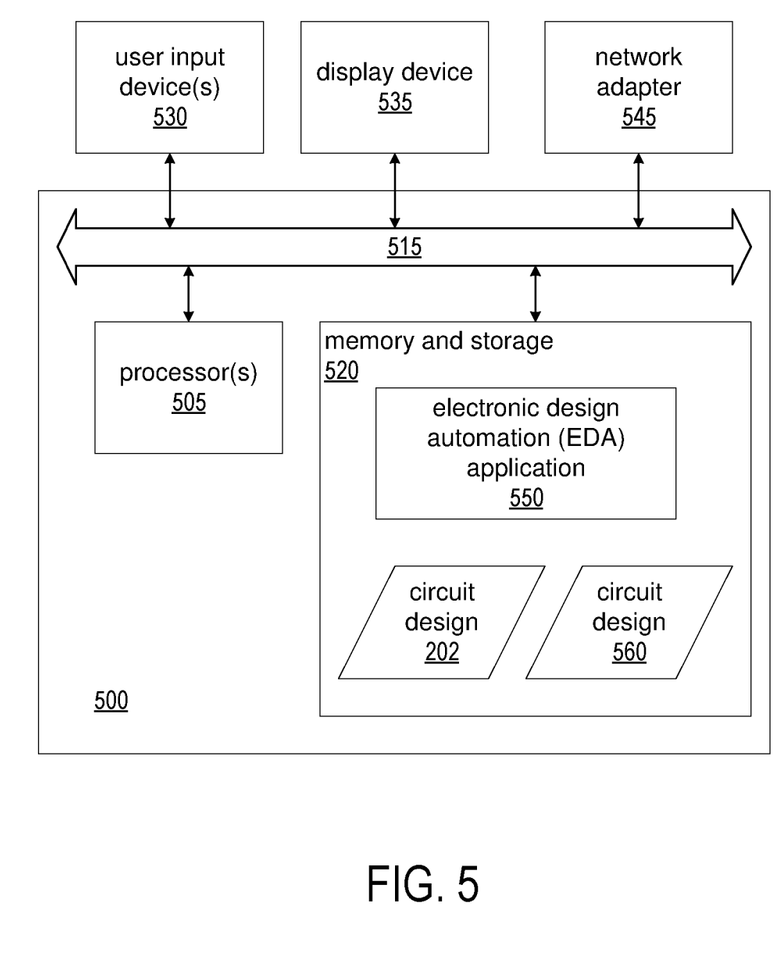
FIG. 5 is a block diagram illustrating an exemplary data processing system.

FIG. 5 is a block diagram illustrating an exemplary data processing system (system) 500. System 500 is an example of an EDA system. As pictured, system 500 includes at least one processor circuit (or "processor"), e.g., a central processing unit (CPU) 505 coupled to memory and storage arrangement 520 through a system bus 515 or other suitable circuitry. System 500 stores program code and circuit design 100 within memory and storage arrangement 520. Processor 505 executes the program code accessed from the memory and storage arrangement 520 via system bus 515. In one aspect, system 500 is implemented as a computer or other data processing system that is suitable for storing and/or executing program code. It should be appreciated, however, that system 500 can be implemented in the form of any system including a processor and memory that is capable of performing the functions described within this disclosure.

Memory and storage arrangement 520 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 500 may also include one or more cache memories (not shown) that provide temporary storage of at least some program code and data in order to reduce the number of times program code and data must be retrieved from local memory and persistent storage during execution.

Input/output (I/O) devices such as user input device(s) 530 and a display device 535 may be optionally coupled to system 500. The I/O devices may be coupled to system 500 either directly or through intervening I/O controllers. A network adapter 545 also can be coupled to system 500 in order to couple system 500 to other systems, computer systems, remote printers, and/or remote storage devices through intervening private or public networks. Modems, cable modems, Ethernet cards, and wireless transceivers are examples of different types of network adapter 545 that can be used with system 500.

Memory and storage arrangement 520 may store an EDA application 550. EDA application 550, being implemented in the form of executable program code, is executed by processor(s) 505. As such, EDA application 550 is considered part of system 500. System 500, while executing EDA application 550, receives and operates on circuit design 100. In one aspect, system 500 constructs classifier and regressor models (FIG. 1), performs an implementation flow on circuit design 202, and applies the models to the circuit design as described above. System 500 generates data suitable for making an IC as circuit design 560.

EDA application 550, circuit design 100, circuit design 560, and any data items used, generated, and/or operated upon by EDA application 550 are functional data structures that impart functionality when employed as part of system 500 or when such elements, including derivations and/or modifications thereof, are loaded into an IC such as a programmable IC causing implementation and/or configuration of a circuit design within the programmable IC.

Figure 6:
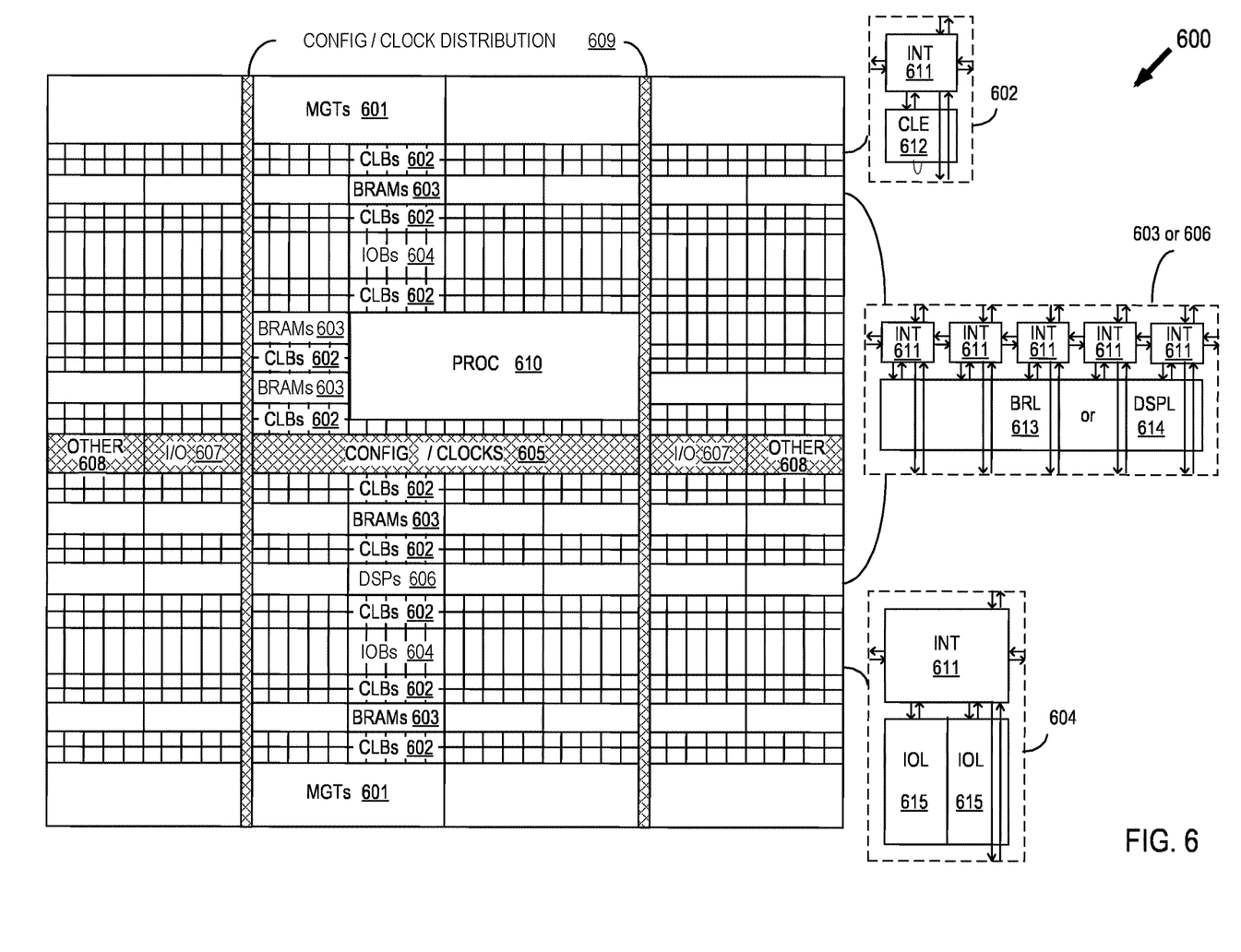
FIG. 6 shows a programmable integrated circuit to which implementations can be targeted for circuit designs processed in accordance with the disclosed methods and systems.

FIG. 6 shows a programmable integrated circuit (IC) 600 to which implementations can be targeted for circuit designs processed in accordance with the disclosed methods and systems. The programmable IC may also be referred to as a System On Chip (SOC) that includes field programmable gate array logic (FPGA) along with other programmable resources. FPGA logic may include several different types of programmable logic blocks in the array. For example, FIG. 6 illustrates programmable IC 600 that includes a large number of different programmable tiles including multi-gigabit transceivers (MGTs) 601, configurable logic blocks (CLBs) 602, random access memory blocks (BRAMs) 603, input/output blocks (IOBs) 604, configuration and clocking logic (CONFIG/CLOCKS) 605, digital signal processing blocks (DSPs) 606, specialized input/output blocks (I/O) 607, for example, clock ports, and other programmable logic 608 such as digital clock managers, analog-to-digital converters, system monitoring logic, and so forth. Some programmable IC having FPGA logic also include dedicated processor blocks (PROC) 610 and internal and external reconfiguration ports (not shown). Circuit designs processed according to the disclosed methods and systems can also be implemented as ASICs or on an adaptive compute acceleration platform (ACAP). An ACAP has FPGA fabric with distributed memory and hardware-programmable DSP blocks, a multicore SoC, and one or more software programmable, yet hardware adaptable, compute engines, all connected through a network on chip (NoC).

In some FPGA logic, each programmable tile includes a programmable interconnect element (INT) 611 having standardized connections to and from a corresponding interconnect element in each adjacent tile. Therefore, the programmable interconnect elements taken together implement the programmable interconnect structure for the illustrated FPGA logic. The programmable interconnect element INT 611 also includes the connections to and from the programmable logic element within the same tile, as shown by the examples included at the top of FIG. 6.

For example, a CLB 602 can include a configurable logic element CLE 612 that can be programmed to implement user logic, plus a single programmable interconnect element INT 611. A BRAM 603 can include a BRAM logic element (BRL) 613 in addition to one or more programmable interconnect elements. Typically, the number of interconnect elements included in a tile depends on the height of the tile. The illustrated BRAM tile has the same height as five CLBs, but other numbers (e.g., four) can also be used. A DSP tile 606 can include a DSP logic element (DSPL) 614 in addition to an appropriate number of programmable interconnect elements. An 10B 604 can include, for example, two instances of an input/output logic element (IOL) 615 in addition to one instance of the programmable interconnect element INT 611. As will be clear to those of skill in the art, the actual I/O bond pads connected, for example, to the I/O logic element 615, are manufactured using metal layered above the various illustrated logic blocks, and typically are not confined to the area of the input/output logic element 615.

A columnar area near the center of the die (shown shaded in FIG. 6) is used for configuration, clock, and other control logic. Horizontal areas 609 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 6 include additional logic blocks that disrupt the regular columnar structure making up a large part of the programmable IC. The additional logic blocks can be programmable blocks and/or dedicated logic. For example, the processor block PROC 610 shown in FIG. 6 spans several columns of CLBs and BRAMs.

Note that FIG. 6 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 6 are purely exemplary. For example, in an actual programmable IC, more than one adjacent column of CLBs is typically included wherever the CLBs appear, to facilitate the efficient implementation of user logic.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The disclosed methods and systems are thought to be applicable to a variety of systems for implementing circuit designs into an integrated circuit. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method, comprising:
    identifying features of a circuit design produced by a design tool from processing the circuit design through a first phase of a plurality of phases of an implementation flow;
    applying a plurality of classifier models to the identified features produced by the design tool, wherein each classifier model is associated with a directive of a plurality of directives, the plurality of directives are associated with a second phase of the implementation flow, each directive specifies a set of parameter settings for the second phase, and each classifier model returns a value indicative of whether or not application of the associated directive is likely to improve a quality metric;

applying regressor models of each set of a plurality of sets of regressor models to the features by the design tool, wherein each directive is associated with a set of the plurality of sets of regressor models, and a respective combined score from each set of regressor models indicates a likelihood of satisfying a design constraint by the associated directive;

ranking the directives based on the values indicated by the classifier models and scores from the sets of regressor models; and processing the circuit design in the second phase of the implementation flow by the design tool using the directive having the highest rank.

2. The method of claim 1, further comprising:
determining by each regressor model a category score from a category metric of the circuit design, wherein the category score indicates a likelihood of satisfying a design constraint by the associated directive; and
determining the respective combined score for each set of the plurality of sets of regressor models based on the category scores from the regressor models of the set.

3. The method of claim 1, wherein the features include an indicator that a count of high-fanout nets is greater than a first threshold, and a net having a count of fanouts greater than a second threshold is a high-fanout net.

4. The method of claim 1, wherein the features include an indicator that signals presence in the circuit design of a non-buffered net having a count of fanouts greater than a first threshold.

5. The method of claim 1, wherein the quality metric indicates a maximum attainable clock frequency.

6. The method of claim 1, further comprising ranking an explore directive as a highest ranking directive in response to the values from the classifier models indicating that none of the plurality of directives is likely to improve the quality metric by a threshold amount.

7. The method of claim 1, wherein the second phase of the implementation flow is placement.

8. The method of claim 1, wherein the quality metric indicates power consumption.

9. The method of claim 1, further comprising:
determining by each regressor model a category score that indicates a degree to which a respective metric of a plurality of respective metrics satisfies an associated respective threshold, wherein the plurality of respective metrics include a first metric that indicates a worst negative slack, a second metric that indicates a level of utilization of a circuit resource, a third metric that indicates a count of instances of a certain clock structure, a fourth metric that indicates a count of congested regions; and
determining the respective combined score for each set of the plurality of sets of regressor models based on the category scores from the regressor models of the set, wherein the combined score is the score indicative of a likelihood of improvement of the quality metric by the associated directive.

10. The method of claim 9, wherein the plurality of respective metrics include a fifth metric that indicates a maximum attainable clock frequency, and a sixth metric that is a combination of values of two or more of the first, second, third, fourth, and fifth metrics.

11. The method of claim 1, wherein the value returned by each classifier model is a binary value.

12. The method of claim 1, wherein each classifier model returns a value indicative of whether or not application of the associated directive is likely to improve the quality metric by a threshold amount.

13. The method of claim 1, further comprising generating by the design tool, implementation data suitable for making an integrated circuit (IC).

14. A method, comprising:
performing an implementation flow through one phase by a design tool on each circuit design of a training set using each directive of a plurality of directives, wherein the one phase is a phase of a plurality of phases of the implementation flow, and each directive includes a set of parameter settings for the one phase;
determining respective levels of improvement by the design tool, relative to a baseline value, of a quality metric based on values of the quality metric from performing the implementation flow on each circuit design using each directive;
determining a respective feature set of each circuit design by the design tool after performing each implementation flow on the circuit design using each directive;
training a plurality of classifier models based on the determined respective feature sets and the determined respective levels of improvement, wherein each classifier model is associated with one directive of the plurality of directives, and each classifier model returns a value indicative of whether or not application of the associated directive is likely to improve the quality metric; and
training a plurality of sets of regressor models by the design tool based on the respective determined feature sets and likelihood of satisfying a design constraint, wherein each set has two or more regressor models and is associated with a directive of the plurality of directives, and each regressor model returns a category score that indicates a likelihood of satisfying a design constraint based on a category metric of the circuit design.

15. The method of claim 14, wherein a default directive is one directive of the plurality of directives, and the method further comprising performing the implementation flow through the one phase by a design tool using the default directive on a training set and determining a baseline value of a quality metric for each circuit design in the training set.

16. The method of claim 14, wherein the features include an indicator that a count of high-fanout nets is greater than a first threshold, and a net having a count of fanouts greater than a second threshold is a high-fanout net.

17. The method of claim 14, wherein the features include an indicator that signals presence in the circuit design of a non-buffered net having a count of fanouts greater than a first threshold.

18. The method of claim 14, wherein training the plurality of sets of regressor models includes:
training each regressor model to determine a category score that indicates a degree to which a respective metric of a plurality of respective metrics satisfies an associated respective threshold, wherein the plurality of respective metrics include a first metric that indicates a worst negative slack, a second metric that indicates a level of utilization of a circuit resource, a third metric that indicates a count of instances of a certain clock structure, a fourth metric that indicates a count of congested regions.

19. The method of claim 18, wherein the plurality of respective metrics include a fifth metric that indicates a maximum attainable clock frequency, and a sixth metric that is a combination of values of two or more of the first, second, third, fourth, and fifth metrics.

20. A system, comprising:
one or more computer processors configured to execute program code; and
a memory arrangement coupled to the one or more computer processors, wherein the memory arrangement is configured with instructions of a design tool that when executed by the one or more computer processors cause the one or more computer processors to perform operations including:
identifying features of a circuit design produced by the design tool from processing the circuit design through a first phase of a plurality of phases of an implementation flow;
applying a plurality of classifier models to the identified features produced by the design tool, wherein each classifier model is associated with a directive of a plurality of directives, the plurality of directives are associated with a second phase of the implementation flow, each directive specifies a set of parameter settings for the second phase, and each classifier model returns a value indicative of whether or not application of the associated directive is likely to improve a quality metric;
applying regressor models of each set of a plurality of sets of regressor models to the features by the design tool, wherein each directive is associated with a set of the plurality of sets of regressor models, and a respective combined score from each set of regressor models indicates a likelihood of satisfying a design constraint by the associated directive;
ranking the directives based on the values indicated by the classifier models and scores from the sets of regressor models; and
processing the circuit design in the second phase of the implementation flow by the design tool using the directive having the highest rank.

* * * * *